Nov. 18, 1969 O. RAMSTETTER 3,479,473
MECHANICAL SCANNING DEVICE HAVING DISENGAGEABLE SCANNING AND DRIVING MEANS FOR PROGRAM CONTROL CARDS
Filed March 1, 1967
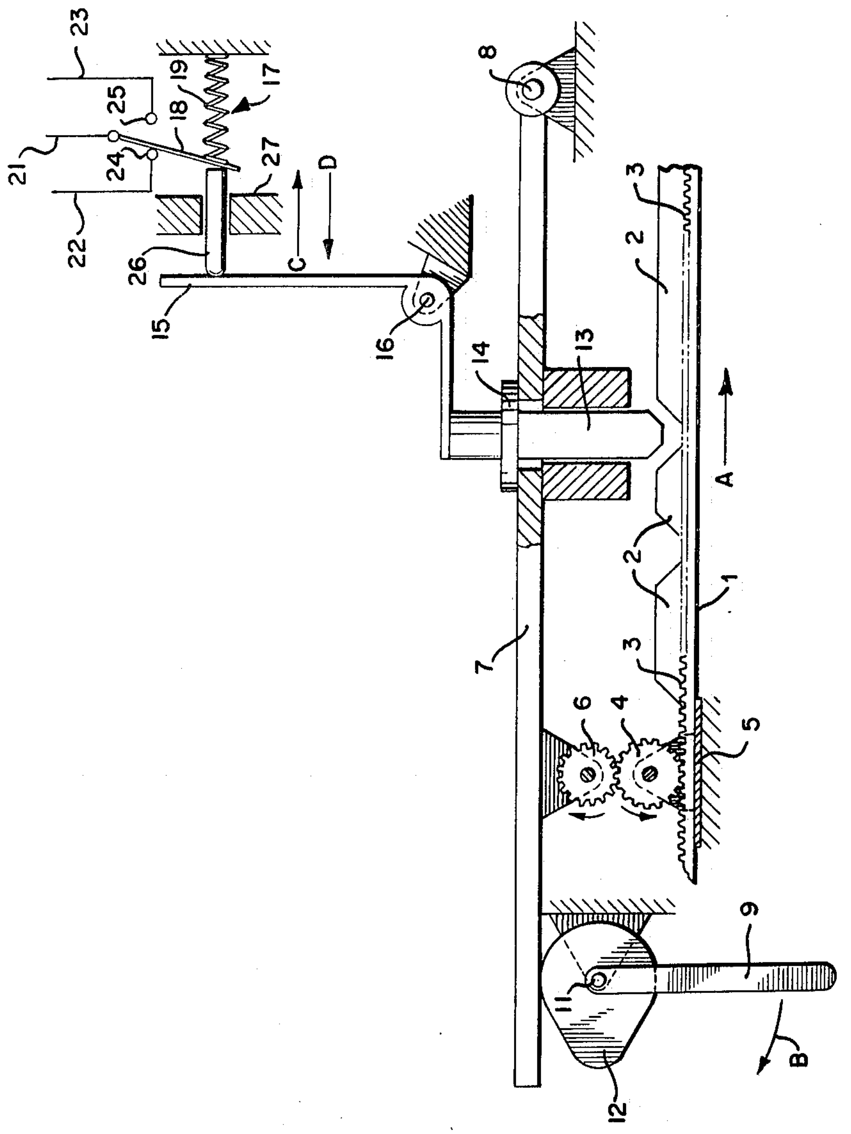
INVENTOR
OTTO RAMSTETTER
BY Nolte & Nolte
ATTORNEYS

United States Patent Office 3,479,473

Patented Nov. 18, 1969

3,479,473

MECHANICAL SCANNING DEVICE HAVING DISENGAGEABLE SCANNING AND DRIVING MEANS FOR PROGRAM CONTROL CARDS

Otto Ramstetter, 22 Prinzeneiche, 813 Starnberg, Germany

Filed Mar. 1, 1967, Ser. No. 619,842
Claims priority, application Austria, May 9, 1966, A 4,347/66
Int. Cl. H01h *43/08*
U.S. Cl. 200—46 8 Claims

ABSTRACT OF THE DISCLOSURE

A mechanical scanner for scanning information-bearing protuberances of a program control card is mounted on a movably mounted support member in operative proximity with the program control card for scanning engagement with the protuberances of the card. A driving device is mounted on the support member for coupling engagement with the drive teeth on the card for moving the card relative to the mechanical scanner. The support member is pivotally mounted for movement relative to the card whereby movement of the support member in a predetermined direction simultaneously disengages the mechanical scanner from the card and the driving device from the teeth on the card.

BACKGROUND OF THE INVENTION

Field of the invention

The present invention relates to a mechanical scanning device for program control cards.

Description of the prior art

A program control card may carry information by its geometric or spatial configuration. The program control card is scanned by a plurality of scanning levers which abut and slide on the information-bearing or control portions or geometric protuberances of said card. The scanning levers cooperate with electric switch contacts. The program control card includes teeth extending in the direction of movement of the card past the scanning device. The teeth engage with a driving gear arrangement which drives the program control card past the scanning levers.

Mechanical scanning devices for scanning program control cards do not accurately or exactly commence the movement or feeding of the card relative to the information-bearing portions of the card when said card is fed to the scanning device. Furthermore, it is mechanically difficult to move or drive the program control card to a certain point in the scanning device, since it is necessary to overcome the physical resistance of the various scanning levers and of the moving or driving arrangement for the cards when they are fed to the scanning device.

Summary of the invention

The principal object of the present invention is to provide a new and improved mechanical scanning device for program control cards. The scanning device of the present invention overcomes the disadvantages of the mechanical scanning devices of the prior art. The scanning device of the present invention for program control cards avoids the necessity for overcoming the physical resistance of the scanning levers and of the moving or driving arrangement when the card is supplied or fed to the scanning device. The program control card is initially positioned in the mechanical scanning device of the present invention at a predetermined point, so that the scanning, which commences with the movement of the card relative to the scanning levers, starts at the predetermined point. In the scanning device of the present invention, the program control card driving or moving arrangement is precisely coupled when it is in engagement. The mechanical scanning device of the present invention operates efficiently, effectively and reliably.

In accordance with the present invention, a mechanical scanning device for a program control card having information-bearing protuberances and a drive arrangement, comprises a movably mounted support member in operative proximity with a program control card. A mechanical scanning arrangement is mounted on the support member for scanning engagement with the information-bearing protuberances of the program control card for scanning the card. A driving arrangement is mounted on the support member for coupling engagement with the drive arrangement of the program control card for moving the card relative to the mechanical scanning arrangement. The support member is movably mounted for movement relative to the program control card in a manner whereby movement of the support member in a predetermined direction simultaneously disengages the scanning arrangement from the program control card and the driving arrangement from the drive arrangement. The drive arrangement of the card comprises teeth thereon and a driven gear fixedly mounted in coupling engagement with the teeth. The driving arrangement comprises a driving gear mounted on the support member for coupling engagement with the driven gear of the program control card. The support member is pivotally mounted for pivotal movement relative to the program control card. The mechanical scanning arrangement comprises a plurality of scanning pins mounted on the support member for free axial movement and a plurality of movably mounted scanning levers each movable by a corresponding one of the scanning pins in accordance with the movement of the corresponding one of the scanning pins by abutment with an information-bearing protuberance of the program control card. A plurality of electric switches is provided for selectively closing and opening electrical circuits connected thereto. A plurality of coupling pins couples each of the scanning levers to a corresponding one of the electric switches. A manually operable arm is movably mounted in operative proximity with the support member for moving the support member.

BRIEF DESCRIPTION OF THE DRAWING

In order that the present invention may be readily carried into effect, it will now be described with reference to the accompanying drawing, wherein the single figure is a schematic diagram, partly in section, of an embodiment of the mechanical scanning device of the present invent for program control cards.

DESCRIPTION OF THE PREFERRED EMBODIMENT

In the figure, a program control card 1 comprises a plurality of geometric or spatial configurations or protuberances 2 which constitute information-bearing portions of said card. The information-bearing portions 2 of the program control card 1 have various lengths and are spaced from each other in the direction of movement of said card, indicated by an arrow A, in accordance with the program indicated by said information-bearing portions of said program control card.

The program control card 1 comprises a plurality of teeth 3 formed therein or thereon or affixed thereto and extending in the direction of movement A of said card. A driven gear 4 is mounted in coupling engagement with the teeth 3. The driven gear 4 is rotatably mounted at a fixed constant distance from a base support 5. The driven gear 4 is driven by a driving gear 6 which is rotatably mounted on a moveable yoke or support member 7. The driving gear 6 is rotated by any suitable means, not shown in the figure.

The yoke or support member 7 is pivotally mounted at a pivot point 8 for pivotal movement about said pivot point away from and toward the program control card 1, in a clockwise or counterclockwise direction or rotation. A manually operated lever or arm 9 is pivotally mounted at a pivot point 11 for pivotal movement about said pivot point in a clockwise or counterclockwise direction or rotation. A cam 12 is affixed to the arm 9 at its pivotally mounted end for rotation with said arm about the pivot point 11.

A plurality of scanning pins 13, of which one is shown in the figure, are mounted on the support member 7 for free movement along their axes in directions substantially perpendicular to said support member. A collar 14 mounted on each scanning pin 13 prevents the pin from slipping off the support member 7. A plurality of scanning levers 15, of which one is shown in the figure, are pivotally mounted with each in operative proximity with a corresponding one of the scanning pins 13. Each scanning lever 15 is of angular or L-shaped configuration and is pivotally mounted at a pivot point 16 for pivotal movement about said pivot point in a clockwise or counterclockwise direction or rotation. The pivot point 16 of each scanning lever 15 is fixed in position.

A plurality of electrical switches 17, of which one is shown in the figure, each comprise a switch arm 18 which may be spring-biased by a spring 19. The switch arm 18 closes a circuit between a line 21 and either a line 22 or a line 23 which terminate at switch contacts 24 and 25, respectively. A plurality of coupling pins 26, of which one is shown in the figure, are movably mounted in corresponding guides 27 for movement in an axial direction indicated by arrows C and D. Each coupling pin 26 serves to mechanically link the corresponding scanning lever 15 and the corresponding switch arm 18.

When the arm 9 is manually rotated in a clockwise direction, as indicated by an arrow B, the support member or yoke 7 is abutted by the protrusion of the cam 12 and is rotated in a clockwise direction about its pivot point 8. The driving gear 6 is disengaged from the driven gear 4, so that the program control card 1 is no longer moved in the direction of the arrow A. The scanning pins 13 are normally moved in their axial directions dependent upon the presence or absence and configuration of the information-bearing protuberances 2 of the program control card 1 and abut the corresponding scanning levers 15 to rotate said scanning levers in a clockwise direction about their pivot points 16. The scanning levers 15 then abut the corresponding coupling pins 26 and move said coupling pins distances in the direction of the arrow C thereby providing an electrical indication of the informtion borne by the program control card 1. When the support member 7 is rotated about its pivot point 8 in a clockwise direction, the scanning pins 13 are lifted from abutment with the program control card 1 at the same time that the driving gear 6 is lifted from engagement with the driven gear 4. The program control card 1 is then freely movable in the direction of the arow A or in the opposite direction and may thus be positioned as desired without mechanical difficulty or the need to overcome physical resistance.

When the support member 7 is rotated about its pivot point 8 in a clockwise direction, the scanning pin 13 abuts one arm of the corresponding scanning lever 15 and rotates said scanning lever in a clockwise direction about its pivot point 16. The other arm of the scanning lever 15 then abuts the coupling pin 26 and moves said coupling pin in the direction of the arrow C to open the circuit of the lines 21 and 22. If the rotation of the support member 7, and therefore of the scanning lever 15 continues in a clockwise direction, the coupling pin 26 will move far enough in the direction of the arrow C to close a circuit between the lines 21 and 23.

It is thus seen that the mechanical scanning device of the present invention permits the disengagement of both the scanning pins 13 and the driving gear 6 from the program control card 1 when desired. This may be manually accomplished when the program control card 1 is first fed to the scanning device, so that said card may be positioned at a predetermined point on said card without the need to overcome mechanical resistance. The scanning pins 13 may subsequently be lowered by manually rotating the support member 7 about its pivot point 8 in a counterclockwise direction, so that said scanning pins move back into engagement with the program control card 1 and the driving gear 6 moves back into the coupling engagement with the driven gear 4. The program control card 1 may then be moved in the direction of the arrow A by the gears 6 and 4 and the teeth 3. Thus, in accordance with the present invention, the driving gears 6 and 4 are coupled and the scanning pins 13 are engaged when the program control card 1 is in a precisely predetermined position relative to the scanning device.

Each of the driving gear 6 and the driven gear 4 may have V-cut type or pointed teeth to facilitate their coupling engagement or meshing. Coupling engagement of the driving and driven gears 6 and 4 may also be facilitated by mounting one of said gears pivotally on its shaft in a manner whereby it may be turned by approximately one pitch.

The program control card 1 itself may be provided with a functional surface such as for example, a projection, which abuts the support member 7 and causes the rotation of said support member in a clockwise direction about its pivot pin 8 when the supply or feeding of said card to the scanning device commences. A stop or block may be operatively positioned relative to the arm 9 or the support member 7 to prevent the introduction or supply of another program control card. Furthermore, different mechanical arrangements may be provided for disengaging the scanning pins 13 and the driving gear 6 either simultaneously or approximately simultaneously under the control of an operating mechanism.

The program control card 1 may comprise a plastic material having a number of information-bearing protuberances or projections extending in the direction of movement of said card. The program control card 1 may be driven continuously, or it may be driven by a step-by-step switching system which moves said card a determined distance per given time interval. In a step-by-step driving system, it is important that the single steps of movement of the card are precisely and exactly associated with an information-bearing portion or protuberances of the card, so that the commencement or start of the movement is exactly defined.

While the invention has been described by means of a specific example and in a specific embodiment, I do not wish to be limited thereto, for obvious modifications will occur to those skilled in the art without departing from the spirit and scope of the invention.

What I claim is:

1. A mechanical scanning device for a program control card having information-bearing protuberances and teeth means, said card being movably supported on a fixed base member, said mechanical scanning device comprising
- a movably mounted support member in operative proximity with a program control card;
- mechanical scanning means mounted on said support member for scanning engagement with the information-bearing protuberances of said program control card for scanning said program control card;
- driving means mounted on said support member for coupling engagement with the teeth means of said program control card for moving said program control card relative to said mechanical scanning means; and mounting means for movably mounting said support member for movement away from and towards said program control card, whereby movement of said support member in a direction away from said card simultaneously disengages said scanning means from said program control card and said driving means from said drive means.

2. A mechanical scanning device as claimed in claim 1, wherein a driven gear is fixedly mounted in coupling engagement with said teeth, and the driving means comprises a driving gear mounted on said support member for coupling engagement with the driven gear of said program control card.

3. A mechanical scanning device as claimed in claim 1, wherein the mounting means for movably mounting said support member comprises pivot means pivotally mounting said support member for pivotal movement relative to said program control card.

4. A mechanical scanning device as claimed in claim 1, wherein said mechanical scanning means comprises a plurality of scanning pins mounted on said support member for free axial movement and a plurality of movably mounted scanning levers each movable by a corresponding one of said scanning pins in accordance with the movement of the corresponding one of said scanning pins by abutment with an information-bearing protuberance of the program control card.

5. A mechanical scanning device as claimed in claim 1, further comprising a manually operable arm movably mounted in operative proximity with said support member for moving said support member.

6. A mechanical scanning device as claimed in claim 4, wherein a driven gear is fixedly mounted in coupling engagement with said teeth, and the driving means comprises a driving gear mounted on said support member for coupling engagement with the driven gear of said program control card.

7. A mechanical scanning device as claimed in claim 6, wherein the mounting means for movably mounting said support member comprises pivot means pivotally mounting said support member for pivotal movement relative to said program control card.

8. A mechanical scanning device as claimed in claim 7, further comprising a plurality of electric switch means for selectively closing and opening electrical circuits connected thereto and a plurality of coupling means coupling each of said scanning levers to a corresponding one of said electric switch means.

References Cited

UNITED STATES PATENTS

| | | | |
|---|---|---|---|
| 2,642,553 | 6/1953 | Williams ---------- | 200—46 X |
| 2,932,259 | 4/1960 | Crum ------------- | 200—46 X |
| 2,977,434 | 3/1961 | Shanahan et al. ------ | 200—46 |
| 3,198,897 | 7/1965 | Scofield et al. -------- | 200—46 |

FOREIGN PATENTS

| | | |
|---|---|---|
| 564,265 | 12/1923 | France. |

ROBERT K. SCHAEFER, Primary Examiner

D. SMITH, Jr., Assistant Examiner

U.S. Cl. X.R.

235—61.11